(12) United States Patent
Komada et al.

(10) Patent No.: US 11,475,380 B2
(45) Date of Patent: Oct. 18, 2022

(54) VEHICLE TEST FACILITY OPERATION RATE ANALYSIS SYSTEM AND METHOD

(71) Applicant: HORIBA, LTD., Kyoto (JP)

(72) Inventors: Mineyuki Komada, Kyoto (JP); Ryoji Ozawa, Kyoto (JP)

(73) Assignee: HORIBA, LTD., Kyoto (JP)

( * ) Notice: Subject to any disclaimer, the term of this patent is extended or adjusted under 35 U.S.C. 154(b) by 637 days.

(21) Appl. No.: 16/411,444

(22) Filed: May 14, 2019

(65) Prior Publication Data
US 2019/0347588 A1   Nov. 14, 2019

(30) Foreign Application Priority Data

May 14, 2018 (JP) .............................. JP2018-092765

(51) Int. Cl.
*G06Q 10/06* (2012.01)
*G01M 15/10* (2006.01)
(Continued)

(52) U.S. Cl.
CPC ...... *G06Q 10/0633* (2013.01); *G01M 15/102* (2013.01); *G01M 17/007* (2013.01); *G01N 1/22* (2013.01); *G06Q 10/06395* (2013.01)

(58) Field of Classification Search
CPC .. G06Q 10/063; G06Q 10/0639; G06Q 50/00; G01N 33/00; G01N 33/0004; G01N 33/0006; G01N 33/0009
See application file for complete search history.

(56) References Cited

U.S. PATENT DOCUMENTS 4,924,404 A * 5/1990 Reinke, Jr. ........... G01R 21/133
                                                        705/412
7,222,111 B1 * 5/2007 Budike, Jr. ........ G06Q 30/0633
                                                        705/412
(Continued)

FOREIGN PATENT DOCUMENTS

JP    2002-071526 A    3/2002
JP    2013-245967 A   12/2013
JP    2015-082179 A    4/2015

OTHER PUBLICATIONS

Groger, Christoph et al., The Operational Process Dashboard for Manufacturing Forth Sixth CIRP Conference on Manufacturing, 2013 (Year: 2013).*

(Continued)

*Primary Examiner* — Scott L Jarrett
(74) *Attorney, Agent, or Firm* — Brooks Kushman P.C.

(57) ABSTRACT

This collectively manages an operation rate of multiple test facilities, and is an operation rate analysis system that is communicably connected to multiple test facilities that test a specimen as being a vehicle or a part of the vehicle and that analyzes an operation rate of the above-mentioned multiple test facilities, and that comprises an operation information obtaining part that obtains operation information of the above-mentioned multiple test facilities, a setting receiving part that receives a user setting relating to an operation judgment condition to judge whether each of the multiple test facilities is in operation or not, and an operation rate calculating part that calculates the operation rate of each of the multiple test facilities or the operation rate of all of the multiple test facilities from the operation information obtained by the operation information obtaining part based on the operation judgment condition received by the setting receiving part.

6 Claims, 6 Drawing Sheets

(51) Int. Cl.
*G01M 17/007* (2006.01)
*G01N 1/22* (2006.01)

(56) References Cited

U.S. PATENT DOCUMENTS

| | | | | |
|---|---|---|---|---|
| 9,275,122 B2* | 3/2016 | Lions | ................... | G06F 16/258 |
| 9,779,367 B2* | 10/2017 | Jonath | ................... | G06Q 10/06 |
| 9,880,707 B2* | 1/2018 | Covington | .......... | G06F 3/04842 |
| 10,921,797 B2* | 2/2021 | Saunders, Jr. | ..... | G05B 23/0272 |
| 2003/0110249 A1* | 6/2003 | Buus | ...................... | G06Q 30/02 |
| | | | | 709/224 |
| 2004/0186927 A1* | 9/2004 | Eryurek | ............. | G05B 23/0278 |
| | | | | 710/13 |
| 2008/0059441 A1* | 3/2008 | Gaug | ..................... | G06Q 10/10 |
| 2013/0021174 A1* | 1/2013 | Silzer, Sr. | ........... | G05D 1/0278 |
| | | | | 701/34.4 |
| 2013/0124033 A1* | 5/2013 | Watanabe | .......... | G01N 33/0004 |
| | | | | 701/33.4 |
| 2013/0246130 A1* | 9/2013 | Michel | .................. | G06F 16/252 |
| | | | | 707/769 |
| 2013/0332241 A1* | 12/2013 | Taylor | ................... | G06F 16/283 |
| | | | | 705/7.36 |
| 2016/0025590 A1* | 1/2016 | Munger | .................. | G01M 7/08 |
| | | | | 73/658 |
| 2016/0292611 A1* | 10/2016 | Boe | .................. | G06Q 10/06393 |
| 2017/0123397 A1* | 5/2017 | Billi | ...................... | G06Q 10/063 |
| 2017/0160733 A1* | 6/2017 | Oostendorp | ....... | G05B 23/0235 |
| 2019/0034066 A1* | 1/2019 | Nayak | ................. | G06F 3/04842 |

OTHER PUBLICATIONS

Using Business Activity Monitoring ES Dashboard Adobe LiveCycle ES, Version 8.0, Jul. 2007 (Year: 2007).*

Office Action dated Aug. 3, 2021 issued in JP patent application No. 2018-092765, 6 pgs.

Decision of refusal dated Nov. 25, 2021 issued for JP patent application No. 2018-092765, 6 pgs.

EESR dated Sep. 20, 2019 issued for European Patent Application No. 19 174 161.0, 8 pages.

* cited by examiner

FIG.4

VEHICLE TEST FACILITY OPERATION RATE ANALYSIS SYSTEM AND METHOD

CROSS-REFERENCE TO RELATED APPLICATION

This application claims priority to Japanese Application No. 2018-092765, filed May 14, 2018, the disclosure of which is incorporated in its entirety by reference herein.

FIELD OF THE ART

This invention relates to an operation rate analysis system, an operation rate analysis program and an operation rate analysis method that analyze an operation rate of a test facility to test a vehicle or a part of the vehicle.

BACKGROUND ART

Conventionally, as a test facility to conduct a test on a vehicle or a part of the vehicle, there is a vehicle exhaust gas measuring system that measures an exhaust gas of an automobile, as shown in the patent document 1.

The vehicle exhaust gas measuring system measures each component in an exhaust gas by running an automobile loaded on a chassis dynamometer according to a predetermined running mode, by taking the exhaust gas discharged from the automobile by the use of a constant volume sampling (CVS) device and by introducing the sample gas taken by the constant volume sampling device into a gas measuring device. In addition, the vehicle exhaust gas measuring system has a schedule managing device to automatically conduct the measurement of the exhaust gas.

The operation rate of this test facility is obtained based on a handwritten paper calculated by a user. In addition, the calculating method uses various approaches such as an hour or a number of tests that vary depending on the user.

PRIOR ART DOCUMENTS

Patent Document

Patent document 1: Japanese Unexamined Patent Application Publication No. 2002-71526

SUMMARY OF THE INVENTION

Problems Solved by the Invention

Recently, the operation rate of a test facility that conducts a test on a vehicle or a part of the vehicle is used as an ROI index (Return on Investment) for judging labor management, personnel distribution between bases, or increase of test facilities.

For example, in case that multiple test facilities are provided in a building and such a building exists at multiple sites, it is necessary to collect the operation rate of the multiple test facilities at the multiple sites and to calculate the operation rate of all sites or the operation rate for each site, resulting in taking labor and time.

In addition, in order to judge the operation rate of the test facilities in the same condition, it is necessary to integrate the condition among the multiple test facilities, the multiple buildings, or the multiple sites. In addition, there is also request that the operation judgment condition be switched in accordance with a purpose of collecting the operation rate.

This invention is to solve all of the problems and a main object of this invention is to collectively manage the operation rate of multiple test facilities.

Means to Solve the Problems

More specifically, an operation rate analysis system in accordance with this invention is an operation rate analysis system that is communicably connected to multiple test facilities that test a specimen as being a vehicle or a part of the vehicle and that analyzes an operation rate of the above-mentioned multiple test facilities, and characterized by comprising an operation information obtaining part that obtains operation information of the above-mentioned multiple test facilities, a setting receiving part that receives a user setting relating to an operation judgment condition to judge whether each of the multiple test facilities is in operation or not, and an operation rate calculating part that calculates the operation rate of each of the multiple test facilities or the operation rate of all of the multiple test facilities from the operation information obtained by the operation information obtaining part based on the operation judgment condition received by the setting receiving part.

In accordance with the operation rate analysis system having the above arrangement, since the operation rate of each of the multiple test facilities or the operation rate of all of the multiple test facilities is calculated from the operation information of the multiple test facilities based on the operation judgment condition set by a user, it is possible to collectively manage the operation rate of the multiple test facilities while reducing labor or time.

Concretely, it is preferable that the operation rate calculating part calculates the operation rate of each of the above-mentioned multiple test facilities or the operation rate of all of the above-mentioned multiple test facilities by the use of the same operation judgment condition.

It is conceived whether the test facility is in operation or not can be judged simply from the electricity consumption of the test facility.

However, since the standard judged to be in operation varies depending on the user, if the electricity consumption alone is used for judgment, there might be a case that unnecessary hour is judged as the operating hour or the operating hour is counted more than the actual hour. For example, in case that the warming-up operation conducted prior to the test is not contained in the operating hour, if the operating hour is judged by the electricity consumption alone, the judged operating hour is accumulated more than the actual operating hour. As a result of this, it becomes difficult to calculate the operation rate that is appropriate and that satisfies the standard of the operation.

Then, it is preferable that the operation judgment condition is set by any of a combination of an electricity consumption of the test facility, a rotation number of a rotor contained in the specimen, a rotational speed of a rotor contained in the test facility and a test name.

In accordance with this arrangement, it is possible to make the warming-up operation not contained in the operating hour by a combination of, for example, the electricity consumption and the test name.

If is preferable that the operation judgment condition is so configured that an AND condition or an OR condition of the above-mentioned combination can be set.

In order to improve usability by making it easy to set or change the operation judgment condition, it is preferable that a window displaying part that displays an input window to input the operation judgment condition is further comprised, and the input window has an item selection input box to select either of the electricity consumption, the rotation number, the rotational speed and the test name, and an AND/OR selection input box to select the above-mentioned AND condition or the above-mentioned OR condition.

There is a case wherein a method for calculating the operation rate varies in response to a user. For example, some user uses the operation rate in the business hour or the operation rate outside of the business hour from a view point of personnel management. Meanwhile, some user uses the operation rate of 24 hours as the mere operation rate of a test facility.

In order to correspond to the various methods for calculating the operation rate, it is preferable that the operation rate calculating part calculates at least one operation rate of the followings (1)~(4)

$$\text{operating hour/business hour} \times 100(\%) \quad (1)$$

$$\text{operating hour/24 hours} \times 100(\%) \quad (2)$$

$$\text{operating hour in business hour/business hour} \times 100(\%) \quad (3)$$

$$\text{operating hour outside of business hour/hour outside of business hour} \times 100(\%). \quad (4)$$

In order to improve usability by making it possible to manage the operation rate by the use of the calendar, it is preferable that the setting receiving part receives a user setting whether operation is scheduled or not for each date on a calendar, and the operation rate calculating part calculates the operation rate of the operation scheduled date received by the setting receiving part.

In addition, this invention is an operation rate analysis program that analyzes an operation rate of multiple test facilities that test a vehicle or a part of the vehicle, and is characterized by providing a computer with functions as an operation information obtaining part that obtains operation information of the above-mentioned multiple test facilities, a setting receiving part that receives a user setting relating to an operation judgment condition to judge whether each of the multiple test facilities is in operation or not, an operation rate calculating part that calculates the operation rate of the multiple test facilities or the operation rate of all of the multiple test facilities from the operation information obtained by the operation information obtaining part based on the operating judgment condition received by the setting receiving part.

Furthermore, this invention is an operation rate analysis method that analyzes an operation rate of multiple test facilities that tests a vehicle or a part of the vehicle, and is characterized by comprising steps of obtaining operation information of the above-mentioned multiple test facilities, and calculating the operation rate of each of the multiple test facilities or the operation rate of all of the multiple test facilities from the obtained operation information based on an operation judgment condition to judge whether each of the multiple test facilities is in operation or not.

Effect of the Invention

In accordance with this invention having this arrangement, it is possible to collectively manage the operation rate of the multiple test facilities.

BRIEF DESCRIPTION OF THE DRAWINGS

FIG. 4 is a calendar setting window of this embodiment.

MODE FOR EMBODYING THE INVENTION

One embodiment of an operation rate analysis system in accordance with this invention will be explained with reference to drawings.

Figure 1:
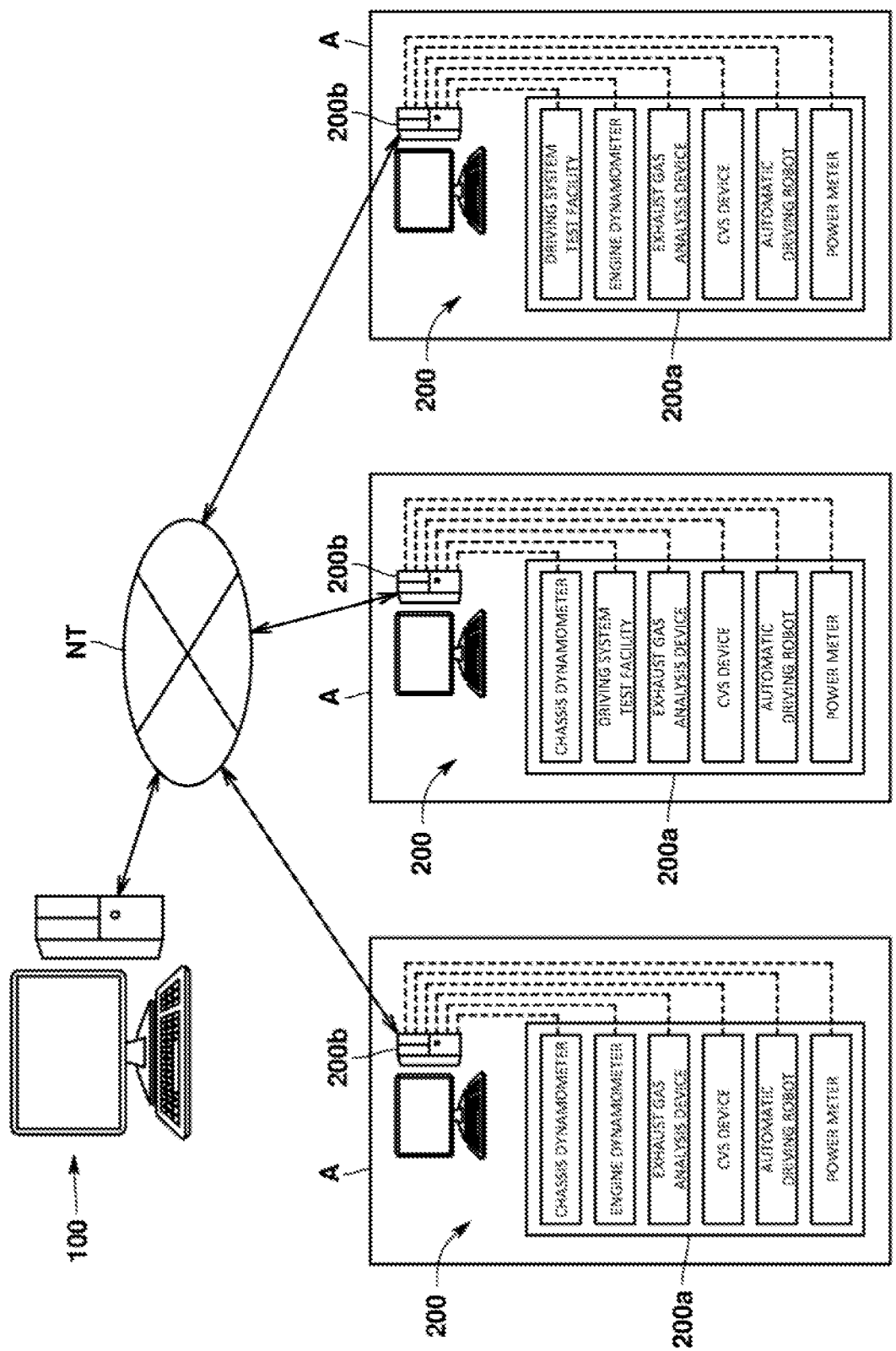
FIG. 1 is a schematic diagram showing a configuration of an operation rate analysis system of this embodiment.

The operation rate analysis system 100 in accordance with this embodiment collectively manages an operation rate of multiple test facilities 200 owned by, for example, the same business operator. The multiple test facilities 200 may be installed in a single building (A), or may be installed separately in multiple buildings (A). FIG. 1 shows an example wherein the multiple test facilities 200 are installed separately in the multiple buildings (A). In addition, the multiple buildings (A) may not be in the same site.

Each of the test facilities 200 comprises a test instrument 200a to test a vehicle or a part of the vehicle, and a management device 200b to manage the test instrument 200a. As the test instrument 200a represented is, for example, a chassis dynamometer, an engine dynamometer, a driving system test facility, an exhaust gas analyzing device, a constant volume sampling device (CVS), an automatic driving robot, a power meter or the like. The management device 200b is a general purpose or dedicated computer having a CPU, an internal memory, an input/output interface, an input device such as a keyboard or a mouse, an output instrument such as a display or a printer or a communication device communicable of the operation rate analysis system 100 through the internet (NT).

Figure 2:
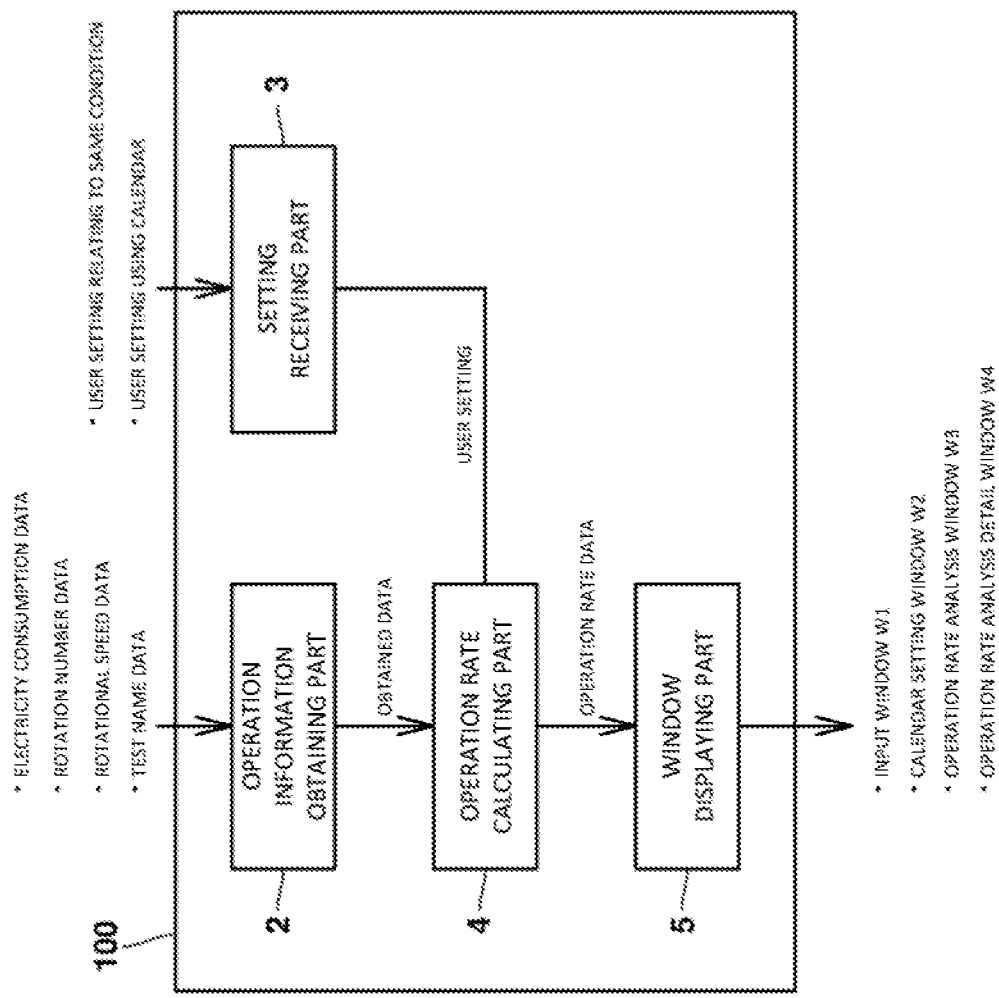
FIG. 2 is a function configuration block diagram of this embodiment.

Concretely, as shown in FIG. 2, the operation rate analysis system 100 is a general purpose or dedicated computer having a CPU, an internal memory, an input/output interface, an input device such as a keyboard or a mouse, an output instrument such a s a display or a printer or a communication device communicable of the management device 200b through the internet (NT).

Then, the operation rate analysis system 100 produces functions as an operation information obtaining part 2, a setting receiving part 3, an operation rate calculating part 4 and a window displaying part 5 by cooperatively working with the CPU and its peripheral devices based on operation rate analysis programs stored in the internal memory.

Each part 2~5 will be explained.

The operation information obtaining part 2 obtains operation information of the multiple test facilities 200. Each data indicating the operation information is transmitted by the management device 200b of each of the test facilities 200.

Each of various data indicating the operation information is an electricity consumption data, a rotation number data (or a rotational speed data) of a rotor (for example, a motor or an engine) contained in the specimen, a rotational speed data (or the rotation number data) of the rotor (for example, a rotary roller of a chassis dynamo meter or a flywheel) contained in the test facility 200 and a test name data.

The electricity consumption data may be the total electricity consumption (energy consumption) of the test facilities 200, and may be the electricity consumption of each test instrument 200a or the electricity consumption (energy consumption) of a specific test instrument 200a. The electricity consumption data is a data obtained by an electricity data of a power meter arranged at a predetermined portion of the test instrument 200a, or a data obtained by an electric current data of an ammeter or a voltage data of a voltmeter arranged at a predetermined portion of the test instrument 200a. The rotation number data is a data obtained by a rotation number sensor that detects the rotation number of the rotor of the test facility 200. The rotational speed data is a data obtained by a rotational speed sensor that detects the rotational speed of the rotor of the test facility 200, and may be a data calculated based on the data obtained by the rotation number sensor. The test name data is a part of a schedule data input into the management device 200b by a user and linked with a date and time data when the concerned test is conducted.

The setting receiving part 3 receives a user setting relating to an operation judgment condition to determine each of the multiple test facilities 200 is in operation or not. The operation judgment condition is set by the use of the input window W1 shown in FIG. 3. This input window W1 makes it possible for the user to set the operation judgment condition collectively. The operation judgment condition may be set collectively, for example, for each laboratory ("Cell 1", "Cell 2", "Cell 3" in FIG. 3), or may be set collectively in all of the laboratories ("Cell all" in FIG. 3). The setting of the operation judgment condition is not limited to this, and the operation judgment condition may be set collectively for the previously set multiple test facilities 20.

Figure 3:
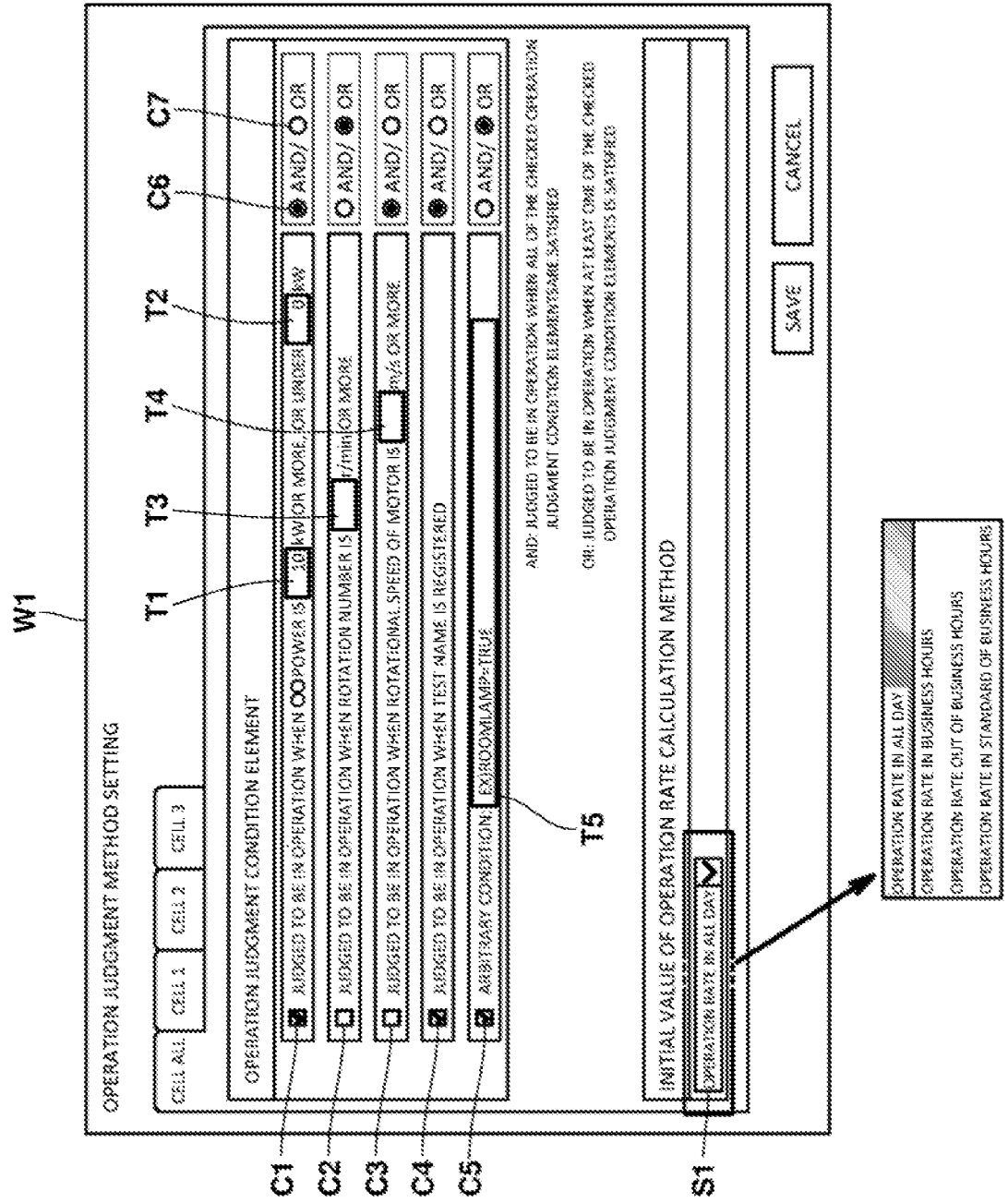
FIG. 3 is an operation rate setting method setting window of this embodiment.

As shown in FIG. 3, the operation judgment condition is set by either combination of; (a) setting of an upper limit value or a lower limit value of the electricity consumption of the test facility 200 (or a predetermined test instrument 200a set/changed by a user). (b) setting of an upper limit value or a lower limit value of the rotation number of the rotor (for example, a motor, an engine or the like) contained in the specimen, (c) setting of an upper limit value or a lower limit value of the rotational speed of the rotor (for example, a rotary roller of a chassis dynamometer, a flywheel, a dynamometer or the like), (d) whether there is the test name or not, and (e) an arbitrary condition arbitrarily set by the user.

In addition, it is possible to set the AND condition or the OR condition for the combination of the item selected among the above-mentioned (a)~(e) as the operation judgment condition. In case of the AND condition, if all of the combination of the items selected among the above-mentioned (a)~(e) are satisfied, it is judged that the test facility 200 is in operation. In case of the OR condition, if either one of the combinations of the items selected among the above-mentioned (a)~(e) is satisfied, it is judged that the test facility 200 is in operation.

Furthermore, the setting receiving part 3 receives a user setting for each date on a calendar whether operation is scheduled or not. Concretely, the setting receiving part 3 receives whether it is a business day or not for each date, whether it is a national holiday or not, a business start time and a business termination time in the business day, whether there is an event (air conditioner maintenance, all company meeting, periodic maintenance, breakdown or typhoon or the like) or not, a start time and a termination time of the event, or whether it is usable or not.

The operation rate calculating part 4 calculates the operation rate of each of the multiple test facilities 200 and the operation rate of all of the multiple test facilities 200 from the operation information obtained by the operation information obtaining part 2 based on the operation judgment condition received by the setting receiving part 3. The operation rate calculating part 4 calculates the operation rate of the following (1)~(4).

$$\text{operating hour (h)/business hour (h)} \times 100(\%) \qquad (1)$$

This operation rate is a ratio of the business hour (a denominator) to the operating hour (a numerator) in one day (24 hours). According to this operation rate, in case that operation is conducted on a business holiday or in case of overtime work, the operation rate becomes 100% or more so that it becomes possible to grasp the operation rate to an estimated plan of the business hour.

$$\text{operating hour/24 hours} \times 100(\%) \qquad (2)$$

This operation rate is a ratio of one day (24 hours) (the denominator) to the operating hour (the numerator) in one day (24 hours).

$$\text{operating hour in business hour/business hour} \times 100 (\%) \qquad (3)$$

This operation rate is a ratio of the business hour (the denominator) to the operating hour (the numerator) in the business hour. According to this operation rate, it is possible to grasp how long operation is conducted in the business hour and to grasp how long operation is not conducted in the business hour.

$$\text{operating hour outside of business hour \% hour outside of business hour} \times 100(\%) \qquad (4)$$

This operation rate is a ratio of hour outside of business hour (a denominator) to the operating hour (a numerator) outside of business hour. In case that the business hour is 8 hours, the hour outside of the business hour is 16 hours. According to this operation rate, it is possible to grasp how long operation is conducted in the outside of business hour and to grasp how long the vehicle test is conducted in the outside of the business hour.

The above-mentioned calculating equation obtains the operation rate on a daily basis, however, it is also possible to obtain the operation rate on a specific period (for example, a weekly) basis.

The window displaying part 5 displays an input window W1 to input the same operation judgment condition by the user. The input window W1 has, as shown in FIG. 3, item selection input boxes (check boxes) C1~C5 for selecting either of (a) the electricity consumption, (b) the rotation number of the rotor contained in the specimen, (c) the rotational speed of the rotor contained in the test facility, (d) the test name, and (e) the arbitrary condition, and AND/OR selection input boxes (check boxes) C6, C7 for selecting the AND condition or the OR condition for each of them. In addition, the input window W1 of this embodiment has electricity consumption input boxes (text input boxes) T1, T2 where the upper limit value or the lower limit value of the electricity consumption is input by the user, a rotation number input box (a text input box) T3 where the lower limit value of the rotation number is input by the user, a rotational speed input box (a text input box) T4 where the lower limit value of the rotational speed is input by the user, and an arbitrary condition input box (a text input box) T5 where an arbitrary condition is input by the user. AND/OR selection input boxes (check boxes) C6, C7 are arranged for each of the item selection input boxes respectively, and the AND condition or the OR condition can be selected individually.

The input window W1 is provided with an operation rate selection box S1 for selecting an initial value of the operation rate calculation method. As the operation rate selected as the initial value, there are above-mentioned (1) operating hour (h)/business hour (h)×100(%) ("operation rate of business hour"), (2) operating hour (h)/24 hours×100(%) ("operation rate of one day"), (3) operating hour in business hour/business hour×100(%) ("operation rate in business hour"), (4) operating hour outside of business hour/hour outside of business hour×100(%) ("operation rate in the outside of business hour").

Figure 4:
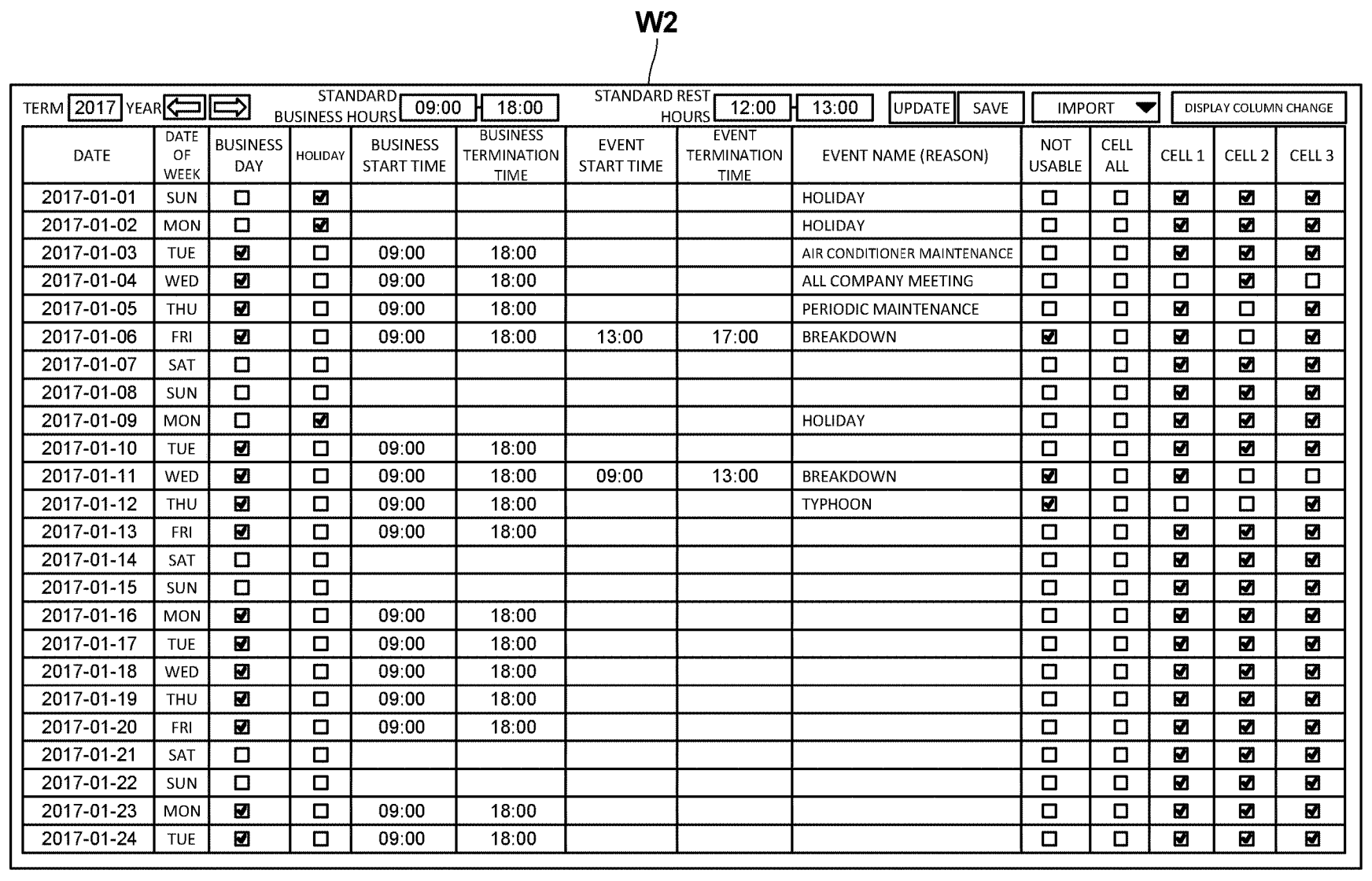

In addition, as shown in FIG. 4, the window displaying part 5 displays a calendar setting window W2 where whether operation is scheduled or not for each date on the calendar is input by the user. The user inputs by the use of the calendar setting window W2 whether it is the business day or not for each date on the calendar, whether it is the national holiday or not for each date on the calendar, the business start time and the business termination time in the business day, whether there is the event (air conditioner maintenance, all company meeting, periodic maintenance, breakdown, typhoon or the like) or not, the start time and the termination time of the event, or whether it is usable or not.

Figure 5:
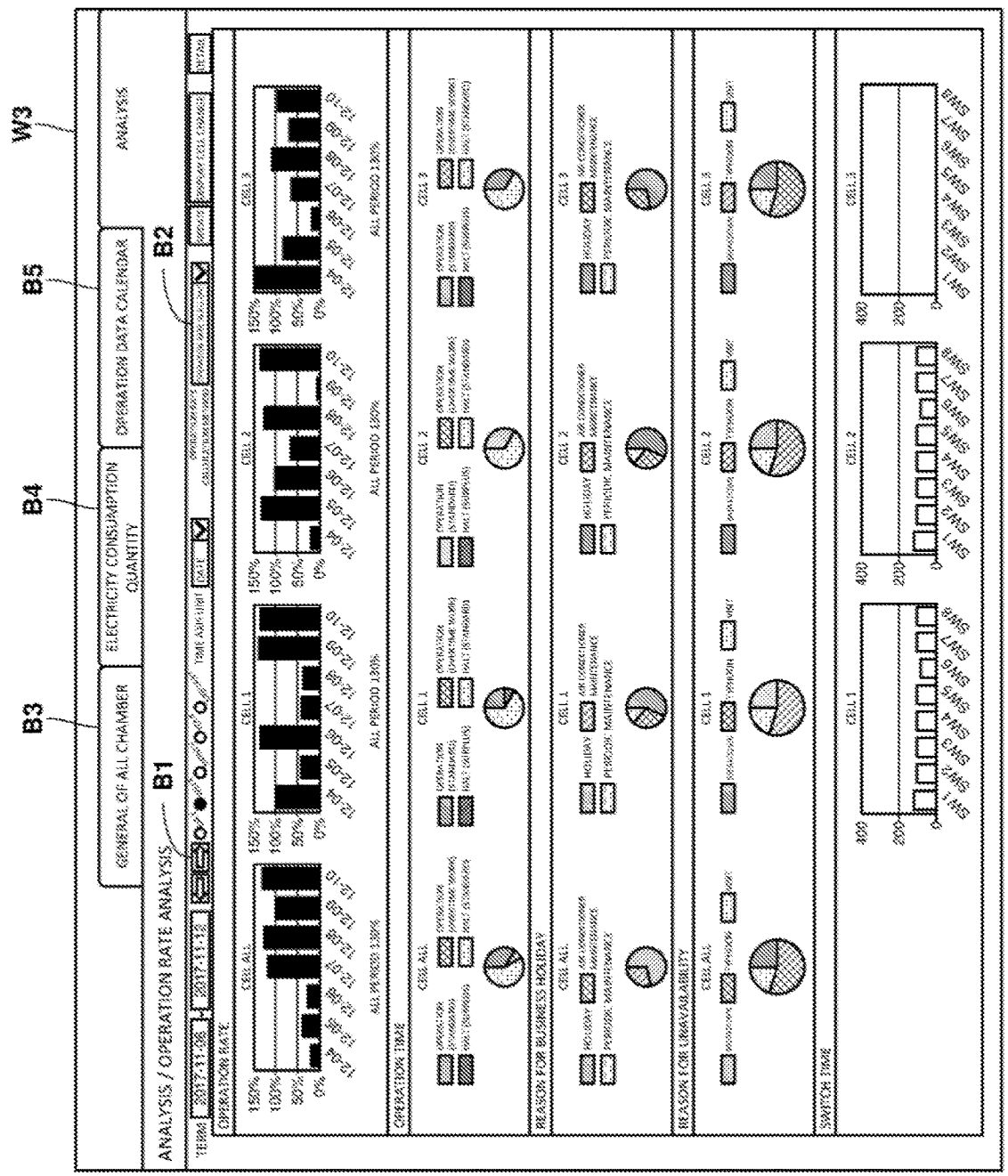
FIG. 5 is an operation rate analysis window of this embodiment.

Furthermore, as shown in FIG. 5, the window displaying part 5 displays an operation rate analysis window W3 that lists the operation rate calculated by the operation rate calculating part 4. Concretely, the window displaying part 5 displays the operation rate of all of the multiple test facilities (Cell 1~Cell 3) for each date and also displays the operation rate of each test facility 200 for each date. In addition, the window displaying part 5 also displays the operation rate in a set period (1 week; December $4^{th}$~December $10^{th}$ in FIG. 5). "Cell all" in FIG. 5 indicates the operation rate of all of Cell 1~Cell 3), and "Cell 1" or the like indicates the operation rate of the test facility Cell 1.

The operation rate analysis window W3 displays the operation rate for each date, the operating hour, a reason for a business holiday, a reason why it is not available, and a switch time for each test facility. FIG. 5 displays the information for each test facility in a horizontal direction on the window, and the operation rate, the operating hour, the reason for the business holiday, the reason why it is not available and the switch time in a vertical direction (a scroll direction).

The operation rate is displayed in a bar graph for each date. Since the operation rate is displayed for each date, a load situation or an idle situation for each date can be verified. According to this content, it is possible to examine a utilization plan more easily and effectively.

The operating hour is classified into "operation (standard) (operating hour in business hour)", "operation (overtime work) (operating hour after the business hour)", "halt (surplus) (remaining hour obtained by subtracting operating hour from business hour)" and "halt (standard) (hour excluding unsteady halt hour from halt hour)" and each ratio of the classified operating hour is displayed in a circular graph. In case of examining the utilization plan, it is possible to examine the priority such that whether any measures to reduce load for overtime work should be taken or not, or whether any measures to increase the operation rate should be taken or not by defining the ratio of the operating hour to the halt hour in a period and the ratio of the excess (overtime work) to the surplus in the period.

The reason for the business holiday is classified into, for example, "national holiday", "air conditioner maintenance", "periodic maintenance" and "irregular maintenance" and each ratio of the reason is expressed in a circle graph. For an explanatory note, since the reason for the business holiday is an event name (reason) registered by the operation data calendar input, it can be a content arbitrarily input by a user. It is possible to grasp the priority of the measured taken for the business holiday by realizing the ratio of the reason for the business holiday in the period.

The reason for unavailability is classified into, for example, "breakdown", "typhoon", "visit" or the like and each ratio of the reason is expressed in a circle graph. For an explanatory note, since the reason for unavailability is an event name (reason) registered by the operation data calendar input, it can be a content arbitrarily input by a user. It is possible to grasp the priority of the measured taken for unavailability by realizing the ratio of the reason for unavailability in the period.

For the switch hour, an ON state of each switch SW1~SW8 in whole of the period is displayed in a bar graph. Each name of the switch SW1~SW8 is obtained from the management device 200b and each character string is displayed.

In addition, since a change button B1 to change the period to be displayed and a change button B2 to change a method for calculating the operation rate are displayed on the operation rate analysis window W3, and it is possible for the user to change the displayed content by operating these buttons B1, B2. In addition, a switch button B3 to switch the window to a window for displaying general of all chamber (operation state of each test facility), a switch button B4 to switch the window to a window for displaying the electricity consumption (or its chronological change) of each instrument for each test facility and a switch button B5 to switch the window to a window for displaying the operation date calendar (the business date calendar).

<Operation Rate Analysis Detail Dialog>

Figure 6:
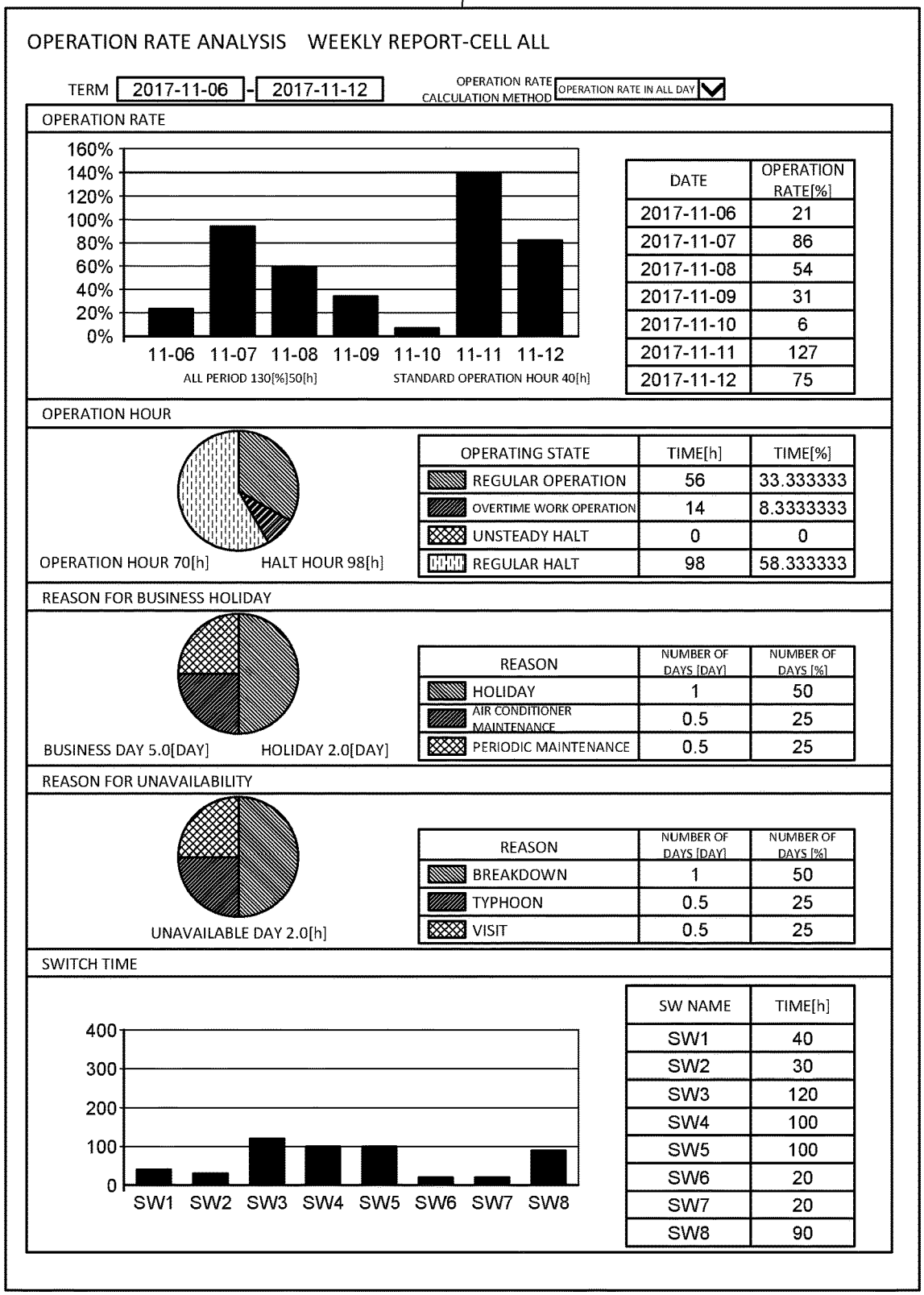
FIG. 6 is an operation rate detail window of this embodiment.

Furthermore, the window displaying part displays an operation rate analysis detail window W4 shown in FIG. 6, in addition to the above-mentioned operation rate analysis window W3. The operation rate analysis detail window W4 is a window that displays a list of each analysis information for "Cell all", "Cell 1", "Cell 2" and "Cell 3" respectively. FIG. 6 is a detail window of "Cell all". The information displayed on this window W4 is, basically, the same as that of the above-mentioned operation rate analysis window W3, and a concrete summary value is displayed around a lower part of each graph.

In an area of displaying the operation rate, the operation rate in all of the periods is displayed under the bar graph and the operation rate for each data is displayed on the right side of the bar graph. In an area of displaying the operation hour, the total operating hour and the total halt hour in the period are displayed under a circle graph and the hour and the ratio for each operating state are displayed on the right side of the circle graph, for example, in a table form. In an area of displaying the business holiday reason, a total number of the business day and a total number of the holiday in the team are displayed under the circular graph, and a number of days and its ratio are displayed for each reason for business holiday on the right side of the circular graph, for example, in a table form. In addition, in an area of displaying the unavailable reason, a total number of unavailable days in the period is displayed under the circle graph and a number of days and its ratio are displayed for each unavailable reason on the right side of the circular graph.

Effect of this Embodiment

In accordance with the operation rate analysis system 100 of this embodiment having the above arrangement, since it is possible to calculate each operation rate of the multiple test facilities 200 or total operation rate of the multiple test facilities 200 from the operation information of the multiple test facilities 200 based on the same operation judgment condition set by the user, it is possible to manage the operation rate of the multiple test facilities 200 collectively while reducing labor or time.

Since it is possible for the user to input the same operation judgment condition into the multiple test facilities 200 by the use of the input window W1, setting of the condition for operation judgment of the multiple test facilities 200 can be simplified and the labor for inputting the operation judgment condition can be reduced.

In addition, since the operation judgment condition is set by either combination of the electricity consumption of the test facility 200, the rotation number of the rotor contained in the test facility 200, the rotational speed of the rotor contained in the test facility 200 and the test name, it becomes possible to measure the operating hour tailored to an object of the user without fail so that the appropriate operation rate that meets the operation standard of the user can be calculated. Since the AND condition or the OR condition as being a combination of the operation judgment condition can be set, it is possible to measure the operating hour that meets the user's object more accurately.

Furthermore, in this embodiment since the operation rate calculating part 4 calculates four kinds of the operation rates, it is possible to use the operation rate within the business hour or the operation rate out of the business hour from a view point of labor management, and the operation rate of 24 hours can be used as a pure operation rate of the test facility.

In addition, since the operation rate analysis system 100 in this embodiment is so configured that the window displaying part 5 displays the input window to input the operation judgment condition and the operation judgment condition can be input through this input window, it is possible to facilitate setting or changing of the operation judgment condition and to improve usability. In addition, since the window displaying part 5 displays the calendar setting window to input an operation schedule, the operation rate can be managed by the use of the calendar and the usability can be improved.

This invention is not limited to the above-mentioned embodiment.

The above-mentioned embodiment is so configured to set the AND/OR condition of five items; (a) the electricity consumption, (b) the rotation number of the rotor contained in the specimen, (c) the rotational speed of the rotor, (d) the test name, and (e) the arbitrary condition, however, an item (for example, ON/OFF of a predetermined switch) other than the above-mentioned five items may be selected. In addition, (e) the arbitrary condition may be omitted.

The operation rate analysis system 100 of the above-mentioned embodiment obtains the operation information of each test facility 200 and calculates the operation rate, however, a part of the function may be provided for the management device 200b of each test facility 200. For example, the information on the business hour or the information on the operation rate judgment condition set by the operation rate analysis system 100 may be transmitted to the management device 200b and the management device 200b that receives the above-mentioned information may calculate the operation rate based on the operation information of the test facility 200 and may transmit the information on the calculated operation rate to the operation rate analysis system 100.

In addition, the window displaying part 5 may display the operation information (a cylinder pressure of a gas cylinder such as, for example, the correction gas, or its chronological change) of the test facility 200.

Furthermore, for example, whether a warming-up operation is contained in the operation or not is set by selecting the AND/OR condition in the combination of five items in the above-mentioned embodiment, however, the AND/OR condition in the combination of five items may be set by selecting whether the warming-up operation is contained in the operation or not. For example, in case that the test name is not registered and the rotational speed of the rotor (for example, a motor) contained in the test facility is a predetermined amount or more, it is judged to be the warming-up operation and it can be contained in the operation. In addition, in case that the rotational speed of the rotor (for example, the motor) contained in the test facility is the predetermined value or more and the rotor (for example, an engine) contained in the specimen is not rotated, it is judged to be the warming-up operation and it can be contained in the operation.

This invention is not limited to the above-mentioned embodiment and it is a matter of course that various modifications may be made without departing from the spirit of this invention.

DESCRIPTION OF THE REFERENCE NUMERALS

100 . . . operation rate analysis system
A . . . building
200 . . . test facility
2 . . . operation information obtaining part
3 . . . setting receiving part
4 . . . operation rate calculating part
5 . . . window displaying part

The invention claimed is:

1. An operation rate analysis system that is communicably connected to multiple vehicle test facilities that test a specimen as being a vehicle or a part of the vehicle and that analyzes an operation rate of the multiple vehicle test facilities, comprising:
   one or more sensors configured to be disposed at the multiple vehicle test facilities and to detect operation information about the multiple vehicle test facilities for transmission over a network;
   one or more processors programmed to
      obtain from the network the operation information about the multiple vehicle test facilities,
      receive a user setting relating to an operation judgment condition to judge whether each of the multiple vehicle test facilities is in operation or not and a user setting identifying whether operation is scheduled or not for each date on a calendar, wherein the operation judgment condition is set by any combination of an electricity consumption of at least one of the multiple vehicle test facilities detected by the one or more sensors, a rotation number of a rotor contained in the specimen detected by the one or more sensors, a rotational speed of a rotor contained in at least one of the multiple vehicle test facilities detected by the one or more sensors, and a test name, and
      calculate the operation rate for the scheduled dates of each of the multiple vehicle test facilities or the operation rate for the scheduled dates of all of the multiple vehicle test facilities from the operation information based on the same operation judgment condition; and an interface configured to display the operation rate of each of the multiple vehicle test facilities or the operation rate of all of the multiple vehicle test facilities.

2. The operation rate analysis system described in claim 1, wherein the operation judgment condition is so configured that an AND condition or an OR condition of the combination is set.

3. The operation rate analysis system described in claim 2, wherein the interface is further configured to display an input window to input the operation judgment condition, wherein the input window has an item selection input box to select either of the electricity consumption, the rotation number, the rotational speed and the test name, and an AND/OR selection input box to select the AND condition or the OR condition.

4. The operation rate analysis system that is described in claim 1 and that calculates at least one operation rate of the following (1) through (4)

$$\text{operating hour/business hour} \times 100(\%) \quad (1)$$

$$\text{operating hour/24 hours} \times 100(\%) \quad (2)$$

$$\text{operating hour in business hour/business hour} \times 100(\%) \quad (3)$$

$$\text{operating hour outside of business hour/outside of business hour} \times 100(\%). \quad (4)$$

5. An operation rate analysis program stored on a non-transitory computer readable storage medium comprising instructions that, when executed by one or more computer processors, analyze an operation rate of multiple vehicle test facilities that test a specimen as being a vehicle or a part of the vehicle by performing functions as an operation information obtaining part configured to obtain operation information, from a network and about each of the multiple vehicle test facilities, detected by one or more sensors at each of the multiple vehicle test facilities and transmitted over the network, a setting receiving part configured to receive a user setting relating to an operation judgment condition to judge whether each of the multiple vehicle test facilities is in operation or not and a user setting identifying whether operation is scheduled or not for each date on a calendar, wherein the operation judgment condition is set by any combination of an electricity consumption of at least one of the multiple vehicle test facilities detected by the one or more sensors, a rotation number of a rotor contained in the specimen detected by the one or more sensors, a rotational speed of a rotor contained in at least one of the multiple vehicle test facilities detected by the one or more sensors, and a test name, an operation rate calculating part configured to calculate the operation rate for the scheduled dates of each of the multiple vehicle test facilities or the operation rate for the scheduled dates of all of the multiple vehicle test facilities from the operation information obtained by the operation information obtaining part based on the same operation judgment condition received by the setting receiving part, and an output part configured to generate an interface that displays the operation rate of each of the multiple vehicle test facilities or the operation rate of all of the multiple vehicle test facilities.

6. An operation rate analysis method that analyzes an operation rate of multiple vehicle test facilities that tests a specimen as being a vehicle or a part of the vehicle, the method comprising:

detecting, by one or more sensors at the multiple vehicle test facilities, operation information about the multiple vehicle test facilities;

transmitting the operation information over a network;

obtaining, by one or more processors, the operation information from the network;

receiving, by the one or more processors, a user setting relating to an operation judgment condition to judge whether each of the multiple vehicle test facilities is in operation or not and a user setting identifying whether operation is scheduled or not for each date on a calendar, wherein the operation judgment condition is set by any combination of an electricity consumption of at least one of the multiple vehicle test facilities detected by the one or more sensors, a rotation number of a rotor contained in the specimen detected by the one or more sensors, a rotational speed of a rotor contained in at least one of the multiple vehicle test facilities detected by the one or more sensors, and a test name;

calculating, by the one or more processors, the operation rate for the scheduled dates of each of the multiple vehicle test facilities or the operation rate for the scheduled dates of all of the multiple vehicle test facilities from the obtained operation information based on a same operation judgment condition to judge whether each of the multiple vehicle test facilities is in operation or not; and displaying, by the one or more processors, an interface conveying the operation rate of each of the multiple vehicle test facilities or the operation rate of all of the multiple vehicle test facilities.

* * * * *